United States Patent
Krupps et al.

(10) Patent No.: US 11,771,162 B2
(45) Date of Patent: Oct. 3, 2023

(54) TEST ENVIRONMENT MONITORING DEVICE FOR ONLINE PROCTORING

(71) Applicants: Brett Krupps, Phoenix, AZ (US); Delon Washo-Krupps, Phoenix, AZ (US)

(72) Inventors: Brett Krupps, Phoenix, AZ (US); Delon Washo-Krupps, Phoenix, AZ (US)

(*) Notice: Subject to any disclaimer, the term of this patent is extended or adjusted under 35 U.S.C. 154(b) by 301 days.

(21) Appl. No.: 17/104,399

(22) Filed: Nov. 25, 2020

(65) Prior Publication Data

US 2022/0165170 A1 May 26, 2022

(51) Int. Cl.
*A42B 1/24* (2021.01)

(52) U.S. Cl.
CPC .................... *A42B 1/24* (2013.01)

(58) Field of Classification Search
CPC ........... A42B 1/24; A42B 1/009; A42B 1/006; A42B 1/242; A42B 1/244; A42B 1/10; A42B 3/042; A42B 3/0406; A45D 42/12; A45D 42/00; A47G 1/16; A47G 1/02; A47G 1/1653; D09B 19/00; G09B 19/00; G09B 5/00; A41D 20/00; A41D 23/00
USPC .............. 434/365, 371, 399, 433; 2/DIG. 11, 2/209.13
See application file for complete search history.

(56) References Cited

U.S. PATENT DOCUMENTS

| | | | | |
|---|---|---|---|---|
| 790,537 A * | 5/1905 | Thayer | A45D 42/12 224/181 |
| 1,024,506 A * | 4/1912 | Graham | A45D 42/12 224/181 |
| 1,504,344 A * | 8/1924 | Hennigh | A42B 1/24 2/DIG. 8 |
| 2,266,977 A * | 12/1941 | Lynch | A45D 42/12 248/472 |
| 2,324,049 A * | 7/1943 | Winslow | A45D 42/12 248/471 |
| 7,063,427 B1 * | 6/2006 | Cutler | G02B 7/002 359/872 |
| 2008/0307560 A1 * | 12/2008 | Bellington | A45D 42/12 2/174 |
| 2013/0305431 A1 * | 11/2013 | Mraz | A42B 5/00 2/173 |
| 2017/0061212 A1 * | 3/2017 | Tanaka | G06F 1/169 |
| 2017/0255018 A1 * | 9/2017 | Goldstein | G02B 27/0179 |
| 2020/0118456 A1 * | 4/2020 | Breed | G02B 27/0093 |

FOREIGN PATENT DOCUMENTS

| | | | | |
|---|---|---|---|---|
| CA | 2298167 A1 * | 8/2001 | | G02C 7/14 |
| CN | 203107070 U * | 8/2013 | | |
| CN | 208693241 U * | 4/2019 | | G02C 7/14 |
| CN | 211796360 U * | 10/2020 | | |
| JP | 08038667 A * | 2/1996 | | |

* cited by examiner

Primary Examiner — Amy Vanatta
(74) Attorney, Agent, or Firm — Noblitt & Newson, PLLC (57) ABSTRACT

The disclosed device and method for a test environment monitoring device according to various aspects of the present technology may comprise may comprise a round frame for placing on the test-taker's head, an optical component having an outward facing convex mirror, and a housing having a coupling component configured to connect the optical component to an exterior surface of the round frame proximate the test-taker's forehead to allow the outward facing convex mirror to display an environment directly in front of the test-taker.

18 Claims, 7 Drawing Sheets

TEST ENVIRONMENT MONITORING DEVICE FOR ONLINE PROCTORING

BACKGROUND OF INVENTION

Online testing allows test-takers to remotely take tests from their homes or other locations where the test-taker is outside of a normal classroom environment or group testing room. Online tests are typically proctored or otherwise monitored to reduce a likelihood that test-takers cheat or attempt to subvert testing guidelines. Conventional systems for preventing cheating involve a proctor observing a testing session through a webcam that is typically situated directly in front of the test-taker. Other conventional systems for preventing cheating may allow a proctor to remotely view a recording of the test-taker's desktop or view the display of the test-taker's computer.

A proctor's field of view during a test that is taken online, however, is limited by the view from the webcam. For example, if a webcam is positioned just above the display screen of a test-taker's computer, the view may not show the space behind the test-taker's computer monitor, the frame of the test-taker's computer monitor, or the immediate work surface around the test-taker's computer or keyboard. The limited field of view may increase the possibility of cheating by test-takers seeking to position aids such as answers or notes on a surface, table, smartphone, or other device located outside the field of view or by projecting answers onto a surface behind the test-taker's computer monitor such as a wall or screen. None of these methods, and countless others, would be detectable by a proctor monitoring the testing session remotely via only a webcam.

Existing systems and methods have attempted various solutions by, for example, using a webcam situated directly in front of the test-taker along with processing various biometric data, e.g., eye movements, sounds and vibrations, but they have not sufficiently addressed the need of the proctoring industry owing to their ineffectiveness, overly technical nature, and need for costly additional computer hardware and software. Thus, the conventional systems, if implemented, have not been successful in eliminating cheating on tests.

SUMMARY OF THE INVENTION

The disclosed device and method for a test environment monitoring device according to various aspects of the present technology may comprise may comprise a round frame for placing on the test-taker's head, an optical component having an outward facing convex mirror, and a housing having a coupling component configured to connect the optical component to an exterior surface of the round frame proximate the test-taker's forehead to allow the outward facing convex mirror to display an environment directly in front of the test-taker.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

DETAILED DESCRIPTION OF EXEMPLARY EMBODIMENTS

The present technology may be described herein in terms of functional block components. Such functional blocks may be realized by any number of components configured to perform the specified functions and achieve the various results. For example, the present technology may employ various frames, optical components, housings, coupling components, and the like, which may carry out a variety of functions. In addition, the present technology may be practiced in conjunction with any number of test environment monitoring devices and any one of various proctoring systems, and the test environment monitoring device described herein is merely one exemplary application for the technology.

Various representative implementations of the present technology may be applied to any number of test-taking environments. As generally used herein, a "test" is any type of application that requires consideration or analysis by a person taking the test (i.e., a test-taker) and a potential response from this person. A test may therefore be considered an examination, a quiz, an assessment, an evaluation, a trial, an analysis, or certification of an individual as qualified to perform a specific task or ability, e.g., a driving test. Furthermore, a test-taker does not necessarily have to be a student of a course or engaged in an educational class.

Figure 1:
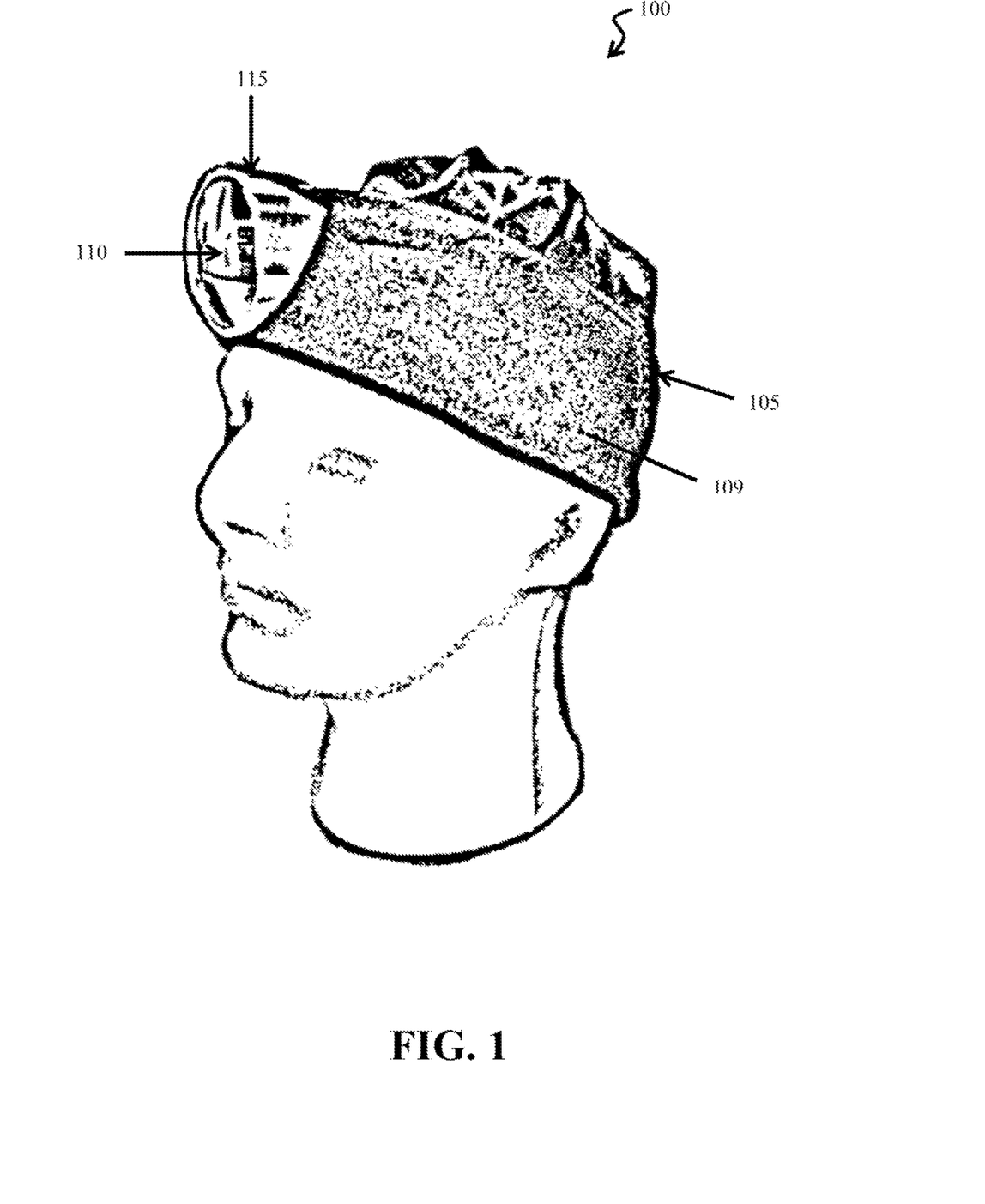
FIG. 1 representatively illustrates a perspective view of a test environment monitoring device in accordance with an exemplary embodiment of the present technology.
Figure 2A:
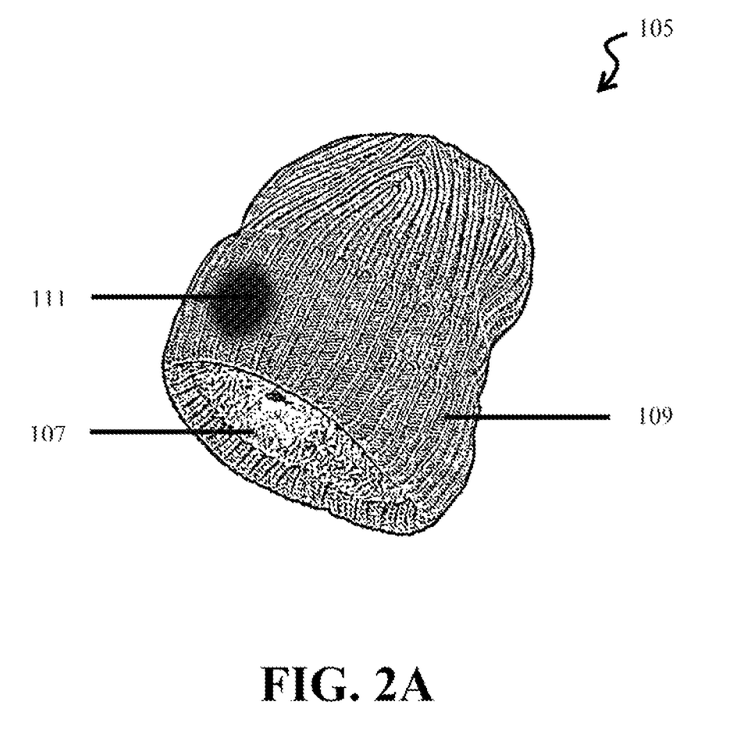
FIG. 2A representatively illustrates a perspective view of a round frame of the test environment monitoring device illustrated in FIG. 1.

Referring to FIG. 1, a test environment monitoring device 100 wearable by a test-taker may comprise a frame 105, an optical component 110, and a housing 115 that connects the optical component 110 to the frame 105. In an exemplary embodiment, the frame 105 may be adapted for placement on the test-taker's head and may be configured to support the optical component 110 and the housing 115. The frame 105 may comprise any suitable device or system wearable by the test-taker, such as: a headgear, a headstrap, a headband, a hat, a stocking cap, a kerchief, or the like. As shown in FIG. 2A, in an exemplary embodiment, the frame 105 may comprise an interior surface 107 and an exterior surface 109. As illustrated in FIGS. 1 and 2A, the interior surface 107 may be configured to be positioned against an outer periphery of the test-taker's head, and the exterior surface 109 may comprise a contact surface 111 configured to be applied against the housing 115 to couple the housing 115 to the exterior surface 109 of the frame 105.

In various embodiments, the frame 105 may be supported by one or both of the test-taker's ears when the frame 105 is placed on the test-taker's head. In other embodiments, the rond frame 105 may not be supported by one or both of the test-taker's ears. It will be appreciated that modifications may be made to the frame 105 without departing from the scope of the technology. Thus, although a single frame is shown in FIG. 2A, there are a variety of configurations whereby the optical component 110 and the housing 115 may be supported and placed on the test-taker's head.

The frame 105 may also be adjustable to provide a more comfortable or customizable fit around or over the test-taker's head. In one embodiment, the frame 105 may include a pliable strip of material that provides enough stretch or elasticity to fit a variety of head sizes. The pliable strip may comprise a stretchy material and may be sewn into or otherwise attached to a portion of the frame 105 that will be in contact with the test-taker's head during use. Alternatively, the frame 105 may in and of itself be formed from the stretchy material. The stretchy material comprise any suitable material or fabric such as: elastic fabric, elastane, microfibers, nylon, polyester, stretchy mesh fabric, cotton, wool, or any combination of suitable fabrics.

In an alternative embodiment, the frame 105 may be fitted with an adjustable strap assembly operable to connect two ends of the frame 105 to provide a holding tension therebetween, such as commonly used on adjustable ball caps. For example, in one embodiment, a first section of the frame 105 may be fitted with a strip of hook and loop fastener which may adhere firmly to a conforming strip of hook and loop fastener fitted to a second section of the frame 105. In this regard, it should be noted that the two strips of hook and loop fastener fitted on the frame 105 may be fitted in any suitable location and manner to adjust a size of the round frame 105 to the test-taker's head.

In an exemplary embodiment, the interior surface 107 of the frame 105 may be made of a comfortable material or fabric intended to be in prolonged contact with the test-taker's head such as polyester, nylon, silk, cotton, wool, linen, and the like. The interior surface 107 of the round frame 105 may, however, be made of any material suitable to create the round frame 105 for placing on the test-taker's head, including, but not limited to, buckram, plastic and metal.

Figure 2B:
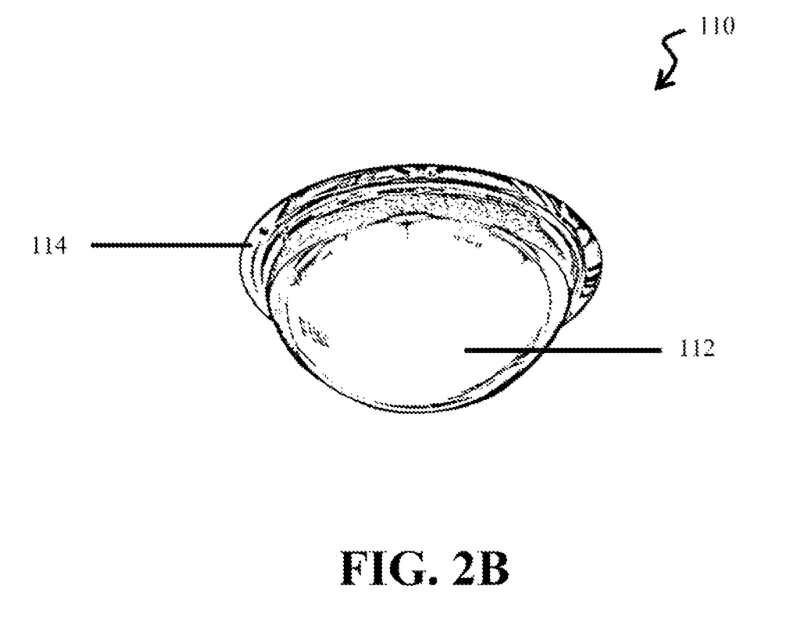
FIG. 2B representatively illustrates a perspective view of an optical component of the test environment monitoring device illustrated in FIG. 1.

Referring now to FIG. 2B, the optical component 110 may comprise an outward facing convex mirror 112. The outward facing convex mirror 112 may have a substantially or perfectly spherical shape and may comprise a circular outer edge 114. For example, in one embodiment, the outward facing convex mirror 112 may comprise a single plano-convex lens having an index of refraction that provides for a high level of reflectivity. The single plano-convex lens may be made from any suitable materials such as glass, polycarbonate, or other plastic for safety purposes. The outward facing convex mirror 112 may, however, be made of any suitable reflective material, including metal, and may have a radius and index of refraction for displaying an environment directly in front of the test-taker. For example, the single plano-convex lens may comprise a radius of between about two inches and about five inches and may be selected according to any criteria such as a resulting field of view, clarity of view, or the like.

The outward facing convex mirror 112 may also comprise any suitable size or shape such as paraboloidal or rectangular. For example, an amount of curvature of the outward facing convex mirror 112 may be selected to provide a wide field of view while maintaining an appropriate level of clarity to allow a proctor to see detailed images in the reflected view of the outward facing convex mirror 112.

In various embodiments, the optical component 110 may comprise a highly reflective surface rather than an actual mirror. The highly-reflective surface may be made of one or more highly-reflective metals such as silver, tin, nickel, chromium, or aluminum. In various embodiments, the highly-reflective metals may further be enhanced with dielectric coatings to enhance the reflectivity of the one or more highly-reflective metals and protect them from scratching and tarnishing. The highly-reflective surface may, however, be configured in any suitable manner for reflectively displaying an environment directly in front of the test-taker.

It will be appreciated that modifications may be made to the optical component 110 without departing from the scope of the invention. For example, the single outward-facing convex mirror 112 as shown in FIG. 2B may instead comprise separate optical components configured to reflect a sufficiently wide viewing range of the environment facing the test-taker.

Figure 2C:
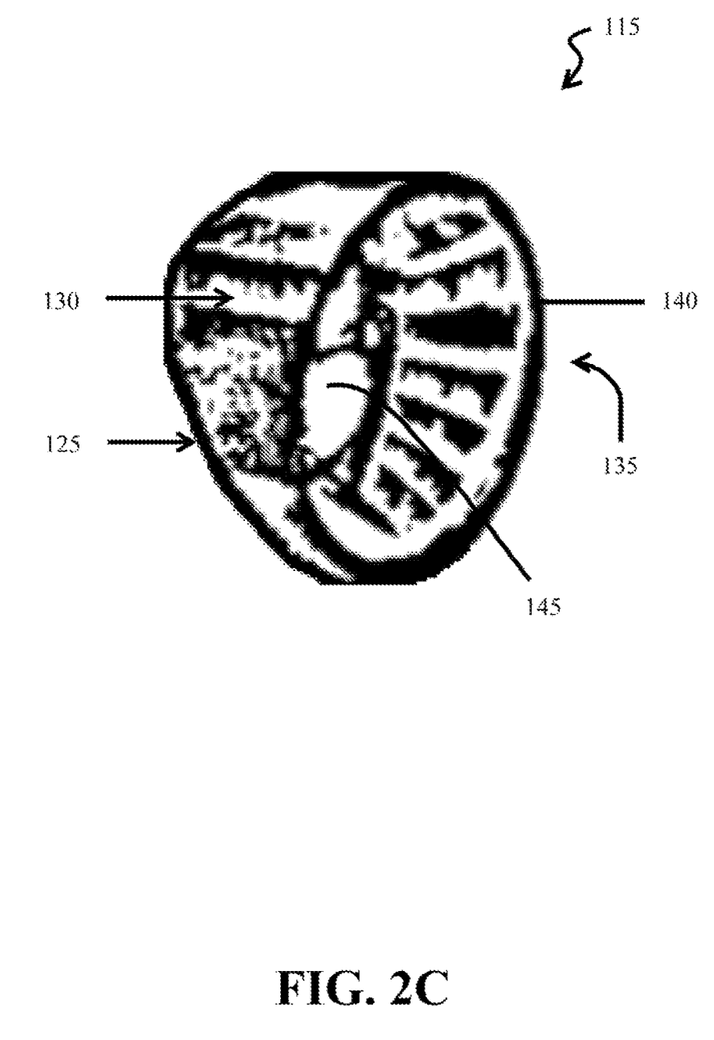
FIG. 2C representatively illustrates a perspective view of a housing of the test environment monitoring device illustrated in FIG. 1.

Referring now to FIGS. 1 and 2C, in an exemplary embodiment, the housing 115 may connect the optical component 110 to the exterior surface 109 of the frame 105 proximate the test-taker's forehead to display the environment directly in front of the test-taker. The housing 115 may comprise a proximal surface 125, a sidewall 130 extending distally from the proximal surface 125 to an open distal end 135 terminating in a peripheral annular edge 140. The housing 115 may further comprise a coupling component 145 located near the proximal surface 125 that is configured to couple the proximal surface 125 of the housing 115 to the exterior surface 109 of the frame 105.

The coupling component 145 may be further configured to selectively disengage the proximal surface 125 of the housing 115 from the exterior surface 109 of the round frame 105 between uses. The coupling component 145 may comprise any suitable system or device configured to couple the proximal surface 125 of the housing 115 to the exterior surface 109 of the frame 105, such as a mechanical fastener, a magnetic material, an adhesive, a tongue and groove, a button, a snap, or a hook and loop fastener.

The housing 115 may comprise any suitable size or shape such as a truncated cylindrical-shaped body or a cubic-shaped body. In various embodiments, the proximal surface 125 of the housing 115 may comprise a curved surface to better conform to a curvature of the test-taker's forehead to permit convenient positioning of the frame 105 when the test environment monitoring device 100 is worn by the test-taker. In other embodiments, the proximal surface 125 of the housing 115 may comprise a flat surface. The housing 115 and the proximal surface 125 may, however, be shaped in any suitable manner to engage the exterior surface 109 of the frame 105.

Figure 3:
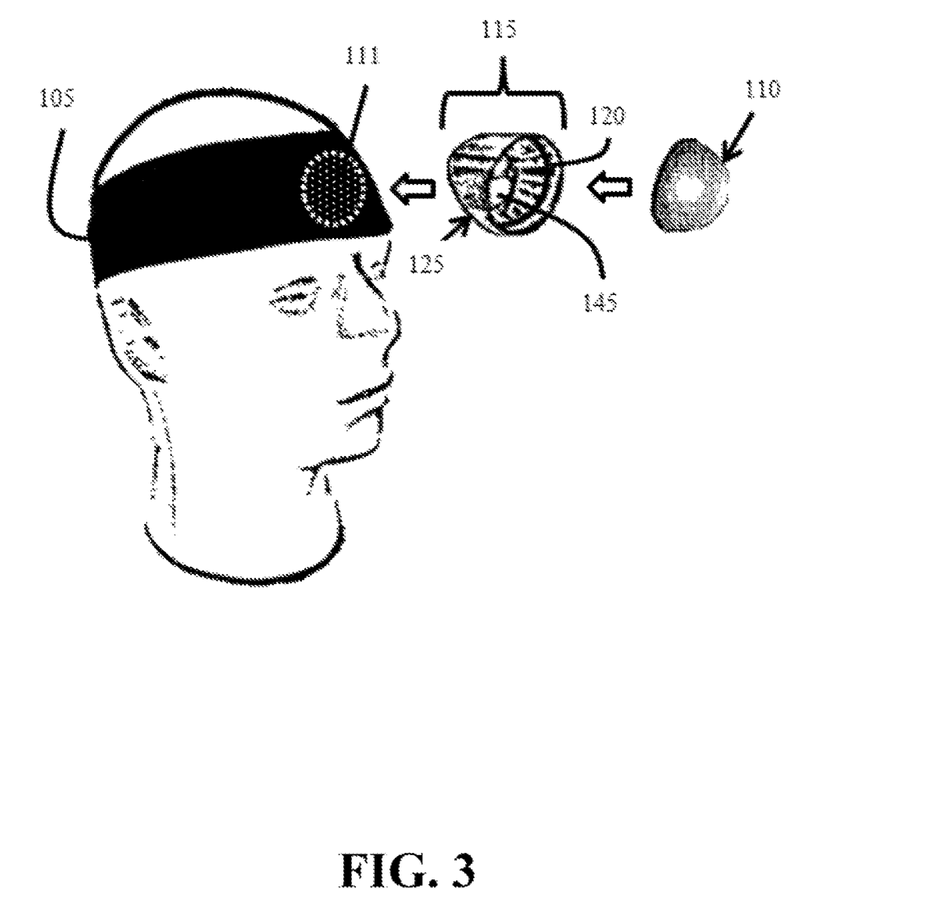
FIG. 3 representatively illustrates an exploded perspective view of the test environment monitoring device illustrated in FIG. 1.

Referring now to FIG. 3, in an exemplary embodiment, the coupling component 145 may protrude through an aperture (not shown) located on the proximal surface 125 of the housing 115 to allow the coupling component 145 to engage a contact surface 111 of the frame 105 and couple the housing 115 to the frame 105. After use, the coupling component 145 may be decoupled from the contact surface 111 of the frame 105 to allow the housing 115 to be withdrawn or otherwise detached from the frame 105.

Figure 4A:
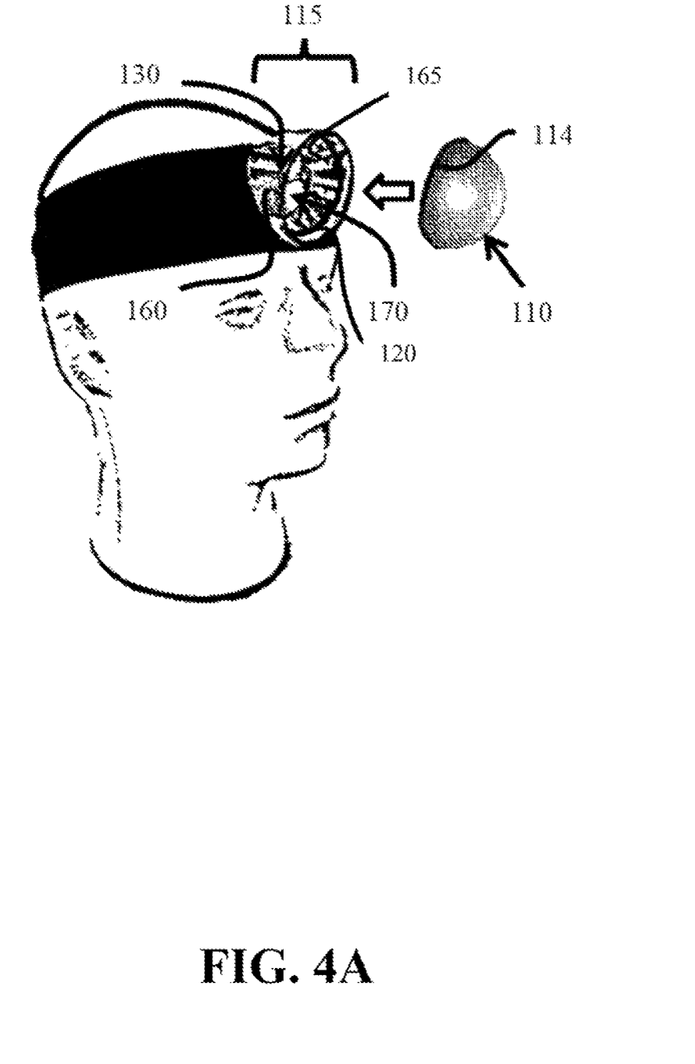
FIG. 4A representatively illustrates a perspective view of the optical component illustrated in FIG. 2B decoupled from the housing illustrated in FIG. 2C.
Figure 4B:
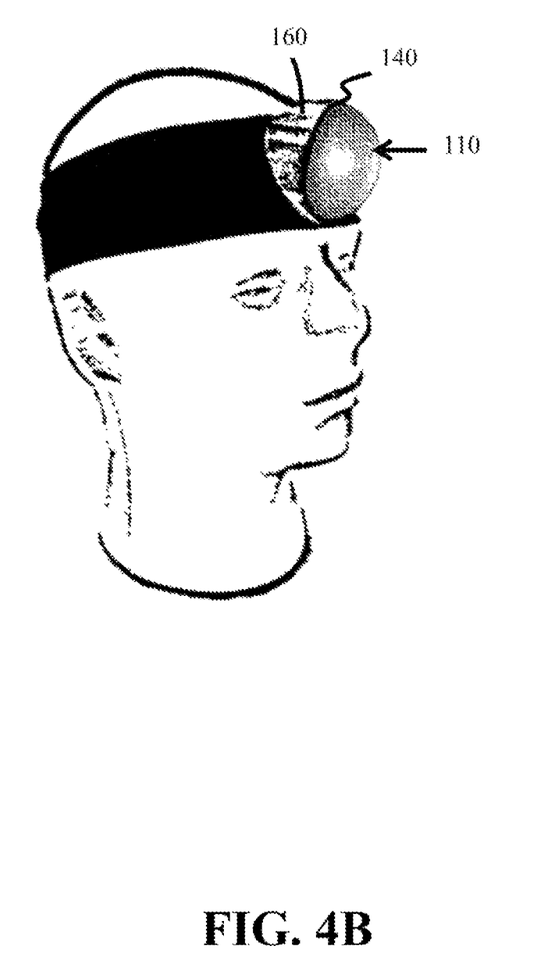
FIG. 4B representatively illustrates a perspective view of the optical component illustrated in FIG. 2B coupled to the housing illustrated in FIG. 2C.

Referring now to FIGS. 4A and 4B, in an exemplary embodiment, the sidewall 130 may comprise an outer surface 160 and an inner surface 165 that defines a receptacle cavity 170 in the housing 115. The inner surface 165 of the sidewall 130 may be configured to receivably engage the optical component 110. For example, the circular outer edge 114 of the optical component 110 may be flush with the inner surface 165 of the housing 115 immediately adjacent the annular edge 140 when receivably engaged with the inner surface 165 of the sidewall 130. The optical component 110 may, however, be receivably engaged to the housing 115 in any suitable manner to couple the optical component 110 to the housing 115.

The receptacle cavity 170 may further comprise a locking component 120. The locking component may comprise any suitable device or system for locking the optical component 110 to the housing 115. In one embodiment, the locking component may be pivotal between a locked position wherein a movement of the optical component 110 with respect to the housing 115 and the round frame 105 may be constrained, and an unlocked position wherein the optical component 110 may be disengaged from the housing 115.

In an alternative embodiment, the locking component 120 may be configured to couple the optical component 110 to the housing 115 in a locked position, whereby the optical component 110 is twisted into the locked position by pressing the optical component 110 towards the housing 115 and turning the optical component 110 to lock into position. Similarly, the locking component 120 may decouple the optical component 110 from the housing 115 in an unlocked position, whereby the optical component 110 is twisted into the unlocked position by turning the optical component 110 to disengage. For example, the housing 115 may comprise a positioning element (not shown) and internal threads (not shown) on the inner surface 165 of the housing 115. The positioning element may be received in a notch (not shown) formed in the circular outer edge 114 of the optical component 110, and the internal threads may be in mating engagement with corresponding threads (not shown) formed on an outside of the circular outer edge 114 of the optical component 110, so that the housing 115 may be coupled to the optical component 110. The internal threads on the inner surface 165 of the housing 115 may be formed spirally and circumferentially on the inner surface 165.

Figure 5:
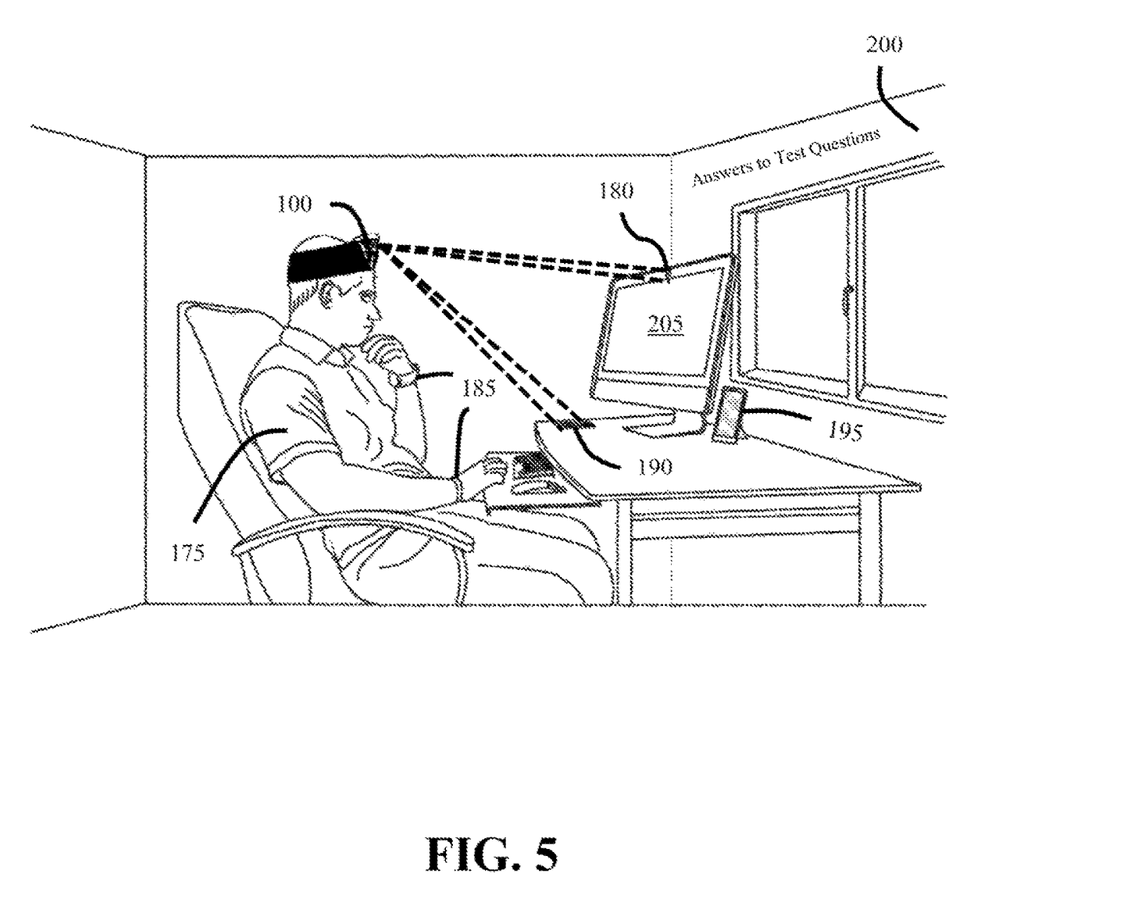
FIG. 5 representatively illustrates the test environment monitoring device positioned for use in accordance with an exemplary embodiment of the present technology.

Referring now to FIG. 5, in operation, a test-taker 175 may wear the test environment monitoring device 100 during a testing session. During the testing session, the test-taker 175 will wear the test environment monitoring device 100 around the periphery of his or her head and a webcam 180 situated directly in front of the test-taker will be turned on for remote viewing by a proctor. The test environment monitoring device 100 may reflect the environment directly in front of the test-taker to the webcam 180. In effect, the test environment monitoring device 100 may provide the proctor who may be monitoring the test-taker through the webcam 180 with an enlarged field of view of the environment directly in front of the test-taker to improve the ability of the proctor to monitor the test-taker's environment to reduce a likelihood of cheating during the test.

The location on the forehead of the test-taker during use allows the field of view to change with respect to movements of the test-taker's head. For example, the field of view of the environment that is reflected to the webcam 180 may follow the test-taker's head movements during the test. This trackability provide a more dynamic monitoring ability as opposed to traditional static methods of monitoring.

As shown in FIG. 5, if the test-taker 175 looks at the smartphone 190 for any number of reasons the field of view as seen by the test-taker is reflected via the optical component 110 of the test environment monitoring device 100 to the webcam 180 allowing the proctor to also view the smartphone 190. Similarly, if the test-taker 175 looks at the wall 200 for any number of reasons the field of view as seen by the test-taker is reflected via the optical component 110 of the test environment monitoring device 100 to the webcam 180, again allowing the proctor to see what the test-taker is looking at. Because the test environment monitoring device 100 may be configured such that the field of view of the environment that is reflected to the webcam 180 follows the test-taker's head movements, the likelihood that a test-taker wearing the exemplary test environment monitoring device 100 is successful in cheating during the testing session is significantly reduced because the proctor monitoring the testing session can easily spot a test-taker who may be viewing answers to the test questions that may be situated outside of the webcam 180's typical field of view.

It will be appreciated that the test environment monitoring device 100 may be operated in a variety of ways without departing from the scope of the invention. As an example, the optical component 110 of the test environment monitoring device 100 may be configured to display in real-time an environment directly in front of the test-taker, whereby a proctor monitoring a testing session via the webcam 180 may be able to view in real-time the environment directly in front of the test-taker. In other embodiments, the webcam 180 may be turned on and set to a recording mode during the testing session, whereby a proctor can review the webcam recording at a later time to determine if the test-taker(s) cheated during the testing session. Thus, the test environment monitoring device 100 may be configured to operate in a variety of ways to reduce and/or eliminate cheating on tests.

In the foregoing specification, the technology has been described with reference to specific exemplary embodiments. Various modifications and changes may be made, however, without departing from the scope of the present technology as set forth in the claims. The specification and figures are illustrative, rather than restrictive, and modifications are intended to be included within the scope of the present technology. Accordingly, the scope of the technology should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims. Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise," "comprises," "comprising," "having," "including," "includes," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A test environment monitoring device wearable by a test-taker and viewable from a webcam, comprising:
a frame configured to be positioned on the test-taker's head above the test-taker's eyes, wherein the frame comprises:
an interior surface configured to be positioned against an outer periphery of the test-taker's head; and
an exterior surface;
a housing positioned along the exterior surface at a forward facing center portion of the frame when the frame is positioned on the test-taker's head, wherein the housing comprises:
a proximal end disposed along the exterior surface of the frame;
an open distal end opposite the proximal and terminating in a peripheral annular edge; and
a sidewall extending outwardly from the proximal end to and around the peripheral annular edge; and
an optical component connected to the open distal end of the housing, wherein the optical component comprises an outward facing convex mirror configured to reflect a wide field image of an environment directly in front of the test-taker to the webcam when the frame is positioned on the test-taker's head.

2. The test environment monitoring device according to claim 1, wherein the frame comprises at least one of a headgear, headstrap, headband, hat, stocking cap, or kerchief.

3. The test environment monitoring device according to claim 1, wherein:
the sidewall comprises an outer surface and an inner surface defining a receptacle cavity in the housing; and
the inner surface is configured to receivably engage the optical component.

4. The test environment monitoring device according to claim 3, wherein:
the housing comprises a truncated cylindrical-shaped body; and
the proximal end comprises a curved surface.

5. The test environment monitoring device according to claim 3, wherein:
the outward facing convex mirror of the optical component comprises a circular outer edge; and
the circular outer edge is flush with the inner surface of the housing immediately adjacent the peripheral annular edge when receivably engaged with the sidewall of the housing.

6. The test environment monitoring device according to claim 3, wherein the receptacle cavity comprises a locking component configured to constrain a movement of the optical component with respect to the frame.

7. The test environment monitoring device according to claim 6, wherein the locking component is further configured to disengage the optical component from the housing.

8. The test environment monitoring device according to claim 3, wherein the housing further comprises a coupling component configured to selectively engage and disengage the proximal end of housing from the exterior surface of the frame.

9. The test environment monitoring device according to claim 8, wherein the coupling component comprises at least one of a magnetic material, adhesive, tongue and groove, button, snap, or hook and loop fastener.

10. A test environment monitoring device wearable by a test-taker and viewable from a webcam, comprising:
a frame configured to be positioned on the test-taker's head above the test-taker's eyes, wherein the frame comprises:
an interior surface configured to be positioned against an outer periphery of the test-taker's head; and
an exterior surface;
a housing coupled to the exterior surface and located at a forward facing center portion of the frame when the frame is positioned on the test-taker's head, wherein the housing comprises:
a proximal end disposed along the exterior surface of the frame;
an open distal end opposite the proximal end terminating in a peripheral annular edge; and
a sidewall extending outwardly from the proximal end to and around the peripheral annular edge, wherein the sidewall comprises an inner surface; and
an optical component connected to the open distal end of the housing and receivably engaged with the inner surface of the sidewall, wherein the optical component comprises a reflective surface configured to reflect a wide field image of an environment directly in front of the test-taker to the webcam when the frame is positioned on the test-taker's head.

11. The test environment monitoring device according to claim 10, wherein the frame comprises at least one of a headgear, headstrap, headband, hat, stocking cap, or kerchief.

12. The test environment monitoring device according to claim 10, wherein:
the housing comprises a truncated cylindrical-shaped body; and
the proximal end comprises a curved surface.

13. The test environment monitoring device according to claim 10, wherein:
the reflective surface of the optical component comprises a circular outer edge; and
the circular outer edge is flush with the inner surface of the housing immediately adjacent the peripheral annular edge when receivably engaged with the sidewall of the housing.

14. The test environment monitoring device according to claim 10, wherein the inner surface further comprises a locking component configured to constrain a movement of the optical component with respect to the frame.

15. The test environment monitoring device according to claim 14, wherein the locking component is further configured to disengage the optical component from the housing.

16. The test environment monitoring device according to claim 10, wherein the housing further comprises a coupling component configured to selectively engage and disengage the proximal end of the housing from the exterior surface of the frame.

17. The test environment monitoring device according to claim 16, wherein the coupling component comprises at least one of a magnetic material, adhesive, tongue and groove, button, snap, or hook and loop fastener.

18. The test environment monitoring device according to claim 10, wherein the reflective surface comprises an outward facing convex mirror.

* * * * *